US 007680600B2

(12) United States Patent
Carnegie et al.

(10) Patent No.: US 7,680,600 B2
(45) Date of Patent: Mar. 16, 2010

(54) METHOD, SYSTEM AND APPARATUS FOR FORMATION TESTER DATA PROCESSING

(75) Inventors: Andrew Carnegie, Kuala Lumpur (MY); Kai Hsu, Sugar Land, TX (US); Julian Pop, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 57 days.

(21) Appl. No.: 11/828,082

(22) Filed: Jul. 25, 2007

(65) Prior Publication Data

US 2009/0030614 A1 Jan. 29, 2009

(51) Int. Cl.
*G06F 17/00* (2006.01)
*G06F 17/40* (2006.01)
*G06F 19/00* (2006.01)

(52) U.S. Cl. ............ 702/17; 73/152.01; 73/152.02; 73/152.54; 166/250.01; 175/40; 175/50; 367/14; 367/37; 367/38; 367/43; 702/1; 702/6; 702/14; 702/187; 702/189; 702/190; 702/191; 708/300; 708/321

(58) Field of Classification Search ............ 340/538.12, 340/853.1; 700/280, 275; 702/11, 195, 191, 702/1, 2, 6, 7, 9, 14, 17, 69, 127, 187, 188, 702/189, 190; 73/152.01, 152.02, 152.03, 73/152.05, 152.06, 152.08, 152.43, 152.54; 166/250.01, 254.1, 254.2; 175/40, 50; 324/323; 367/14, 37, 38, 43, 44, 45, 46, 81, 83; 708/300, 708/319, 321, 819
See application file for complete search history.

(56) References Cited

U.S. PATENT DOCUMENTS

| 3,321,739 | A | * | 5/1967 | Lee | 367/43 |
| 3,327,805 | A | * | 6/1967 | Glazier et al. | 367/44 |
| 4,216,536 | A | * | 8/1980 | More | 367/83 |
| 4,760,563 | A | * | 7/1988 | Beylkin | 367/73 |
| 5,479,440 | A | * | 12/1995 | Esfahani | 375/346 |
| 5,995,447 | A | * | 11/1999 | Mandal et al. | 367/35 |

(Continued)

OTHER PUBLICATIONS

C. Dong, P.S. Hegeman, A. Carnegie, H. Elshahawi, Downhole Measurement of Methane Content and GOR in Formation Fluid Samples, SPE 81481, Apr. 2003, p. 1-11.

(Continued)

*Primary Examiner*—Edward R Cosimano
(74) *Attorney, Agent, or Firm*—Osha • Liang LLP

(57) ABSTRACT

A method for data processing includes transforming measurement data acquired in the time domain during an oilfield operation into a second domain to produce transformed data; identifying distortions in the transformed data; removing the distortions from the transformed data; and transforming back from the second domain to the time domain to produce cleaned-up data. The transforming measurement data may use a Fourier transform or a wavelet transform. The method may further include compressing the cleaned-up data or reconstructing signals from the cleaned-up data. A method for data processing includes decomposing measurement data, which are acquired in an oilfield operation, using a low pass filter to produce a first dataset; decomposing the measurement data using a high pass filter to produce a second dataset; removing distortions from the second dataset to yield a corrected second dataset; and reconstructing a corrected dataset from the first dataset and the corrected second dataset.

19 Claims, 15 Drawing Sheets

U.S. PATENT DOCUMENTS

| | | | | |
|---|---|---|---|---|
| 6,408,079 | B1* | 6/2002 | Katayama et al. | 381/98 |
| 6,643,406 | B1* | 11/2003 | Hajjahmad et al. | 382/240 |
| 6,654,623 | B1* | 11/2003 | Kastle | 600/336 |
| 7,350,568 | B2* | 4/2008 | Mandal et al. | 166/254.2 |
| 7,477,992 | B2* | 1/2009 | Deffenbaugh et al. | 702/14 |
| 7,519,488 | B2* | 4/2009 | Fu et al. | 702/69 |
| 2005/0149264 | A1* | 7/2005 | Tarvin et al. | 702/6 |
| 2005/0265629 | A1* | 12/2005 | Fu et al. | 382/275 |
| 2006/0190181 | A1* | 8/2006 | Deffenbaugh et al. | 702/14 |
| 2009/0135670 | A1* | 5/2009 | Deffenbaugh et al. | 367/43 |

OTHER PUBLICATIONS

Stephane G. Mallat, A Theory for Multiresolution Signal Decomposition: The Wavelet Representation, IEEE Transactions on Pattern Analysis and Machine Intelligence, vol. 11, No. 7, Jul. 1989, p. 674-693.

Stephane Mallat, Wen Liang Hwang, Singularity Detection and Processing with Wavelets, IEEE Transactions on Information Theory, vol. 38, No. 2, Mar. 1992, p. 617-643.

Wim Sweldens, The Lifting Scheme: A Construction of Second Generation Wavelets, Society for Industrial and Applied Mathematics, vol. 29, No. 2, Mar. 1998, p. 511-546.

David L. Donoho, Iain M. Johnstone, Ideal Spatial Adaptation by Wavelet Shrinkage, Department of Statistics, Stanford University, Stanford, CA, 94305-4065, U.S.A., Jun. 1992, Revised Apr. 1993, p. 1-30.

Julian Pop, Harald Laastad, Kare Otto Eriksen, Michael O'Keefe, Jean-Marc Follini, Tone Dahle, Operational Aspects of Formation Pressure Measurements While Drilling, SPE 92494, Feb. 2005, p. 1-16.

Jacob Ziv, Abraham Lempel, A Universal Algorithm for Sequential Data Compression, IEEE Transactions on Information Theory, vol. IT-23, No. 3, May 1977, p. 337-343.

Dake, L.P., "Fundamentals of reservoir engineering"; Oilwell Testing, Ch. 7.6—The Matthews, Brons, Hazebroek Pressure Buildup Theory; Elsevier, Developments in Petroleum Science 8; pp. 179-183.

* cited by examiner

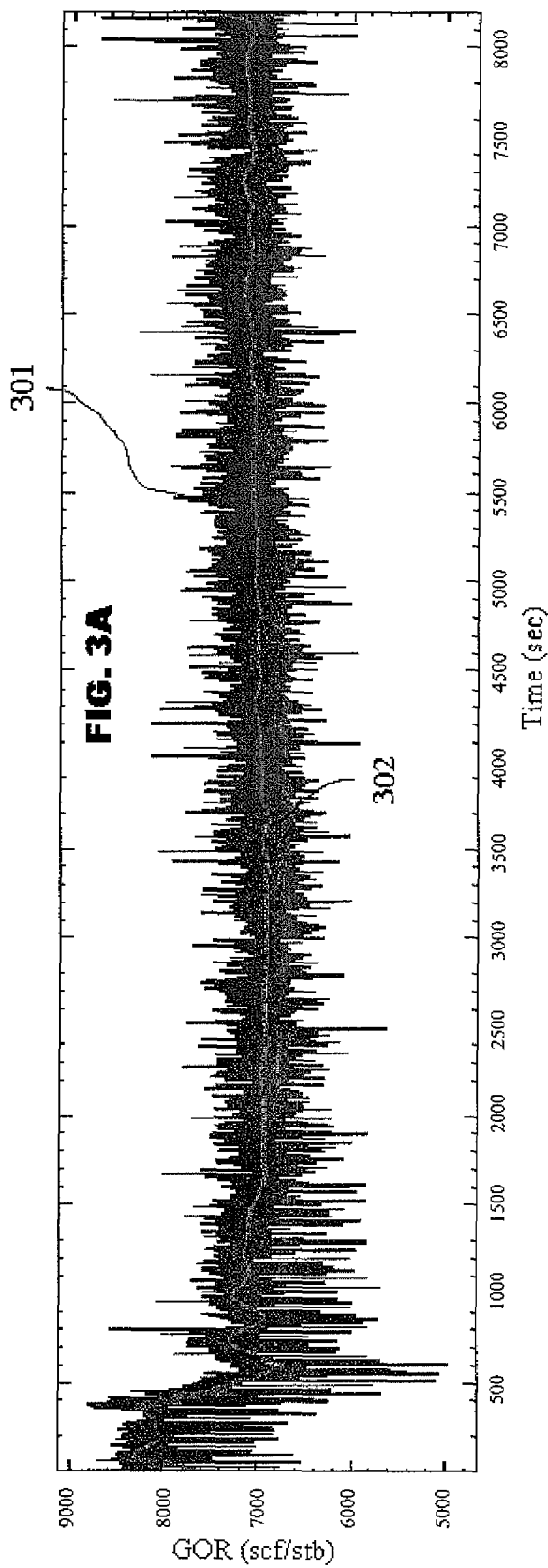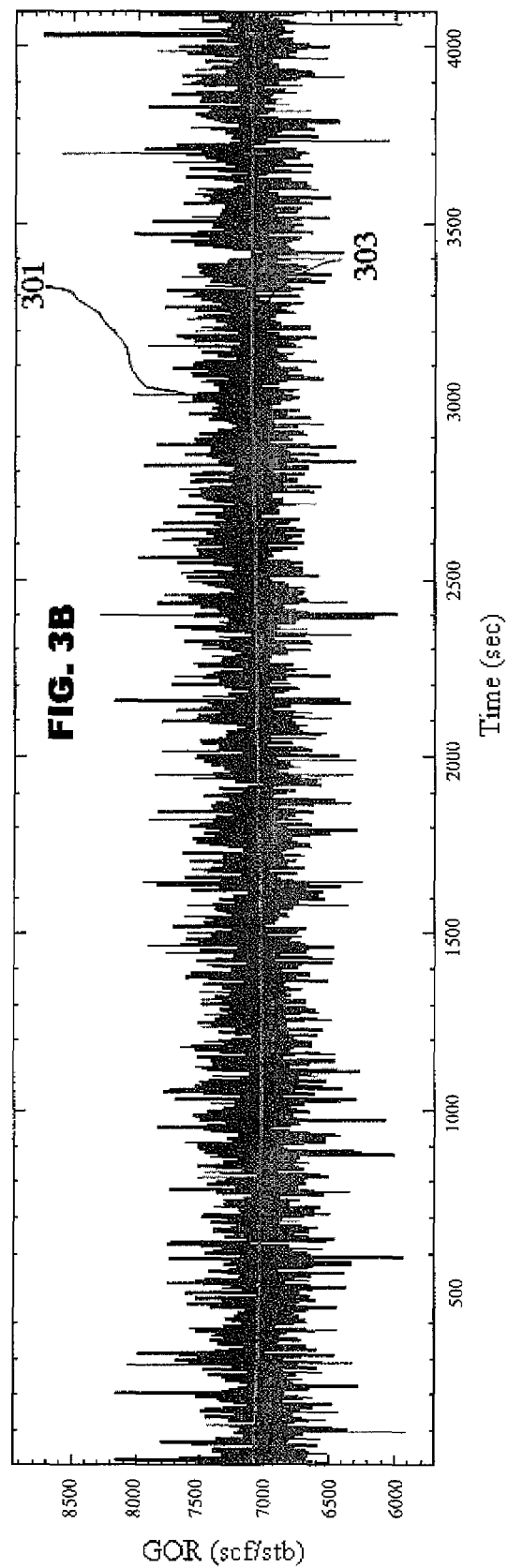

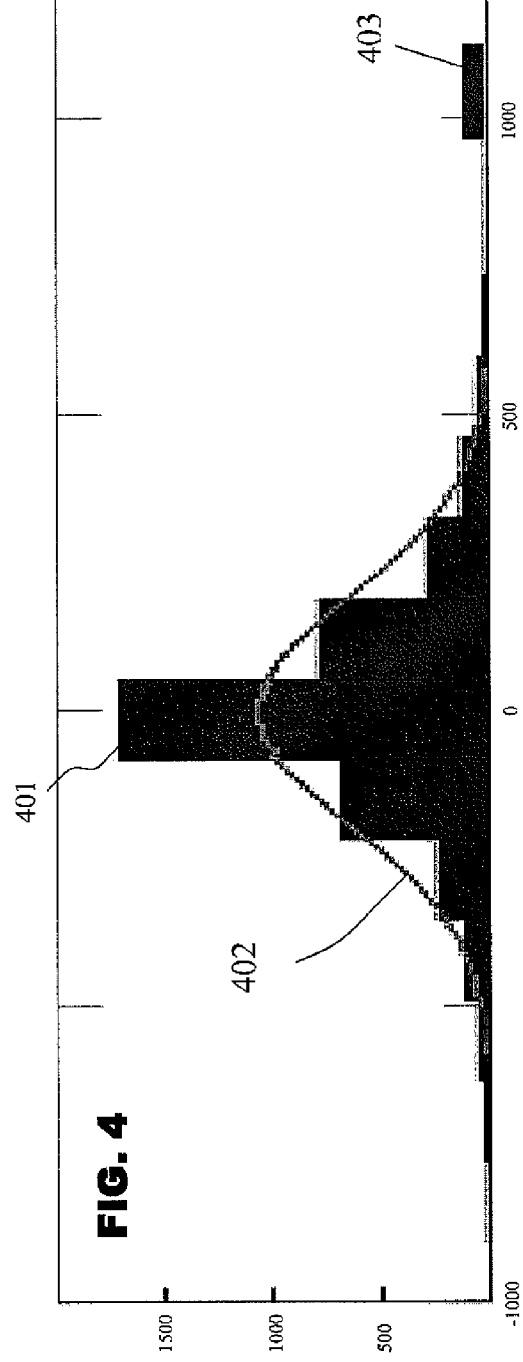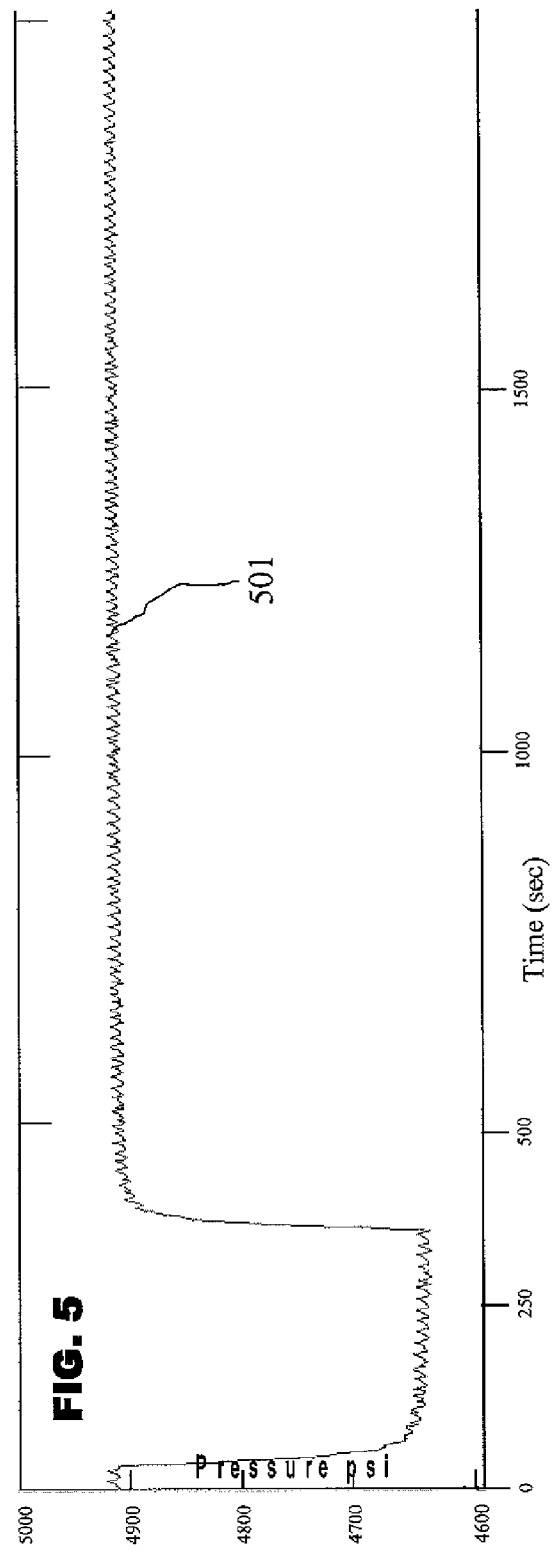

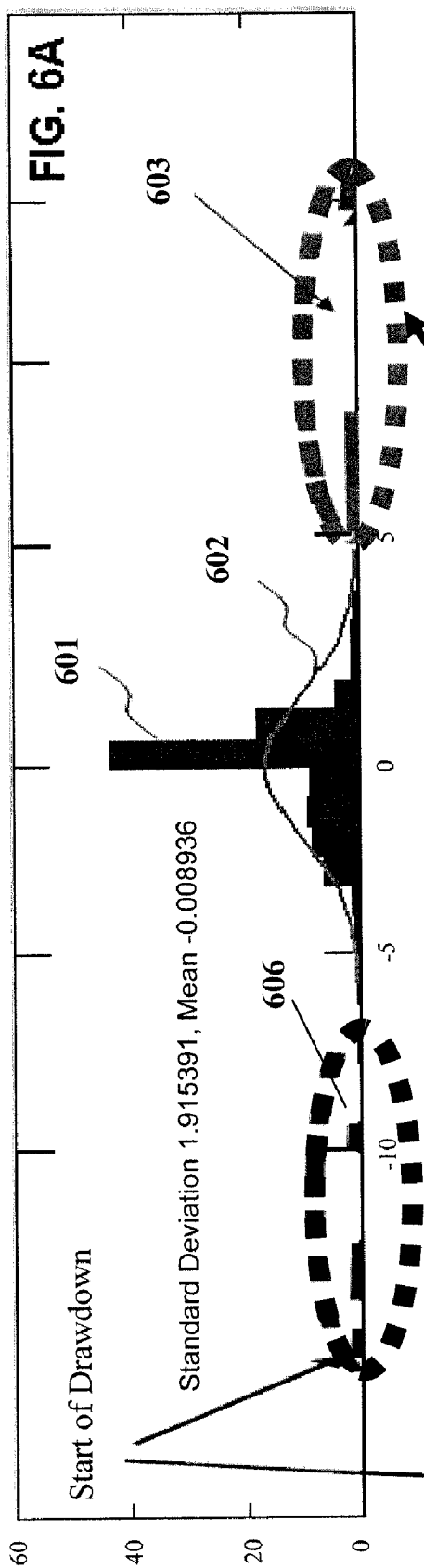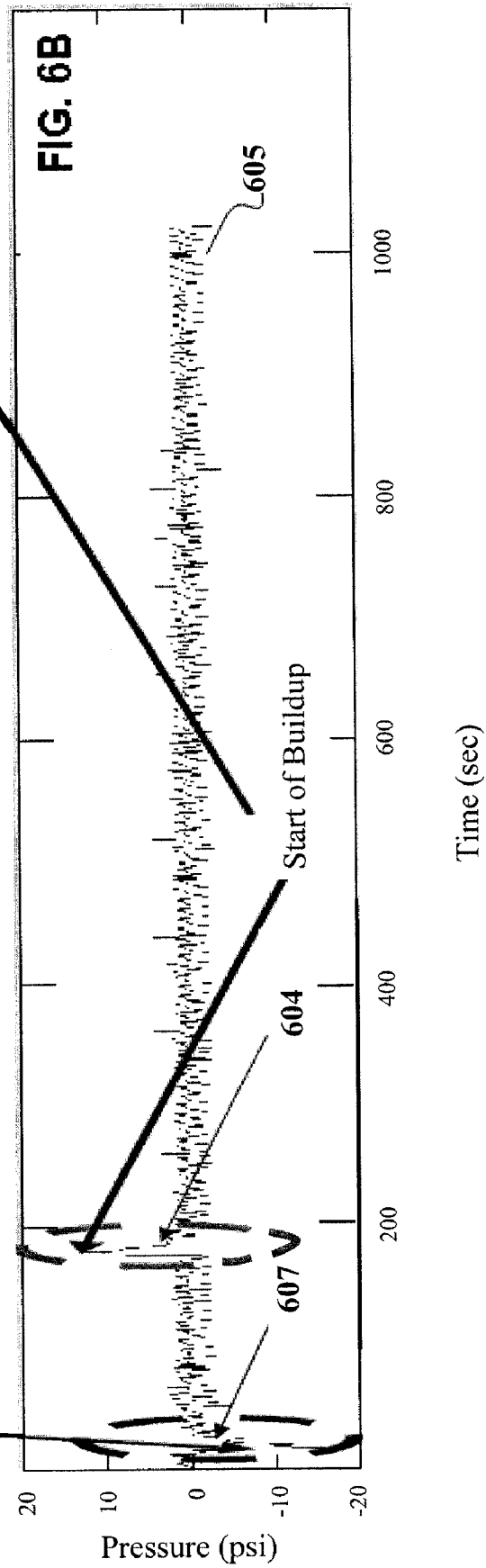

METHOD, SYSTEM AND APPARATUS FOR FORMATION TESTER DATA PROCESSING

BACKGROUND OF THE INVENTION

1. Field of the Invention

The invention relates generally to data processing in oilfield applications. More particularly, the invention relates to processing of data acquired by a downhole tool, such as a formation tester.

2. Background Art

Oil and gas industry uses various tools to probe the formation penetrated by a borehole, to locate hydrocarbon reservoirs and to determine the types and quantities of hydrocarbons. During such a logging operation, a logging tool (such as a formation tester) is lowered into a borehole, either after the well has been drilled or while the well is being drilled. Examples of formation testers in the market include the Modular-Formation Dynamic Tester (MDT®, mark of Schlumberger), and the StethoScope® (mark of Schlumberger).

A formation tester may be lowered into a borehole on a wireline to take measurements after a well has been drilled. See, e.g., Dong et al., "*Downhole Measurement of Methane Content and GOR in Formation Fluid Samples*," paper SPE 81481, for a description of a Wire-line-conveyed Formation Tester (WFT) used in obtaining GOR. When a formation tester is part of a drilling assembly, it can perform formation testing while drilling (FTWD). Measurements performed by the FTWD may include pressures of the formations, which are referred to as formation pressure while drilling (FPWD). See, Pop et al., in "*Operations Aspects Of Formation Pressure Measurements While Drilling*," paper SPE 92494, for a description of FPWD. In addition to FPWD, FTWD are expanding to include measurements such as optical absorption spectroscopy measurements that can be used to compute the Gas/Oil Ratio (GOR).

FIG. 1 is a general illustration of a drilling rig and a drill string with a downhole logging tool in a borehole. The rotary drilling rig shown comprises a mast 1 rising above ground 2 and is fitted with a lifting gear 3. A drill string 4 formed of drill pipes connected one to another is suspended from the lifting gear 3. The drill string 4 has at its lower end a drill bit 5 for drilling the well 6. Lifting gear 31 consists of crown block 7, the axis of which is fixed to the top of mast 1, vertically traveling block 8, to which is attached hook 9, cable if passing round blocks 7 and 8 and forming from crown block 7, on one hand de-ad line 10a anchored to fixed point 11 and on the other active line 10b that winds round the drum of which 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and, lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools, as shown at 30, for investigating downhole drilling conditions or for investigating the properties of the geological formations. Tool 30 may include a formation tester.

Variations in height h of traveling block 8 during drill string raising operations are measured by means of sensor 23 that may be an angle of rotation sensor coupled to the faster pulley of crown block 7. The weight applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. Recorder 28 is connected to processing unit 27, which is preferably a computer. In addition, the downhole tool 30 may also include a processing unit. The downhole processing unit and/or the surface processing unit 27 may be involved in data acquisition, data processing, and telemetry.

Data obtained by a downhole tool are often in the form of time series. Each time-series data may be referred to as a "channel," and includes measurements or computations of a particular quantity, typically obtained at regularly-spaced intervals of time. For example, measurement channels from formation testers (such as the MDT®) may include fluid optical densities, fluid fluorescence emission levels, pressures, temperatures, fluid resistivities, and pump motor speeds, collected using sensors within the formation tester such as an optical spectroscopic device, a pressure sensor, and an acoustic sensor. Computation channels from formation testers, for example, may include water fraction, hydrocarbon Gas-Oil Ratio (GOR) and hydrocarbon compositions.

For FTWD (or other while drilling measurements and logging, i.e., LWD or MWD), it is desirable to send selected data uphole in real time via mud pulse telemetry, because drilling operations need to be adjusted in real time based on the measured data. Mud pulse telemetry is a common method used in LWD or MWV operations to transmit log data to the surface. Mud pulse telemetry makes use of the modulations of the pressure of drilling fluid pumped through the drilling assembly. The fluid pressure modulation, however, has an extremely narrow bandwidth and can only transmit data at a rate of a few bits per second (typically, less than 10 bits per second). The bandwidth of mud pulse telemetry is often the bottleneck of a logging operation. Therefore, it is desirable to have methods or systems that can overcome the bandwidth limitation typically encountered in logging operations.

SUMMARY OF INVENTION

In one aspect, the present invention relates to methods for data processing. A method in accordance with one embodiment of the invention includes transforming measurement data acquired in an oilfield operation into a different domain to produce transformed data; identifying distortions in the transformed data; and removing the distortions from the transformed data to produce cleaned-up data. The transforming may use a Fourier transform or a wavelet transform, such as a discrete wavelet transform. The method may further includes reconstructing signals from the cleaned-up data or compressing the cleaned-up data.

In another aspect, the present invention relates to methods for data processing. A method in accordance with one embodiment of the invention includes decomposing measurement data, which are acquired in an oilfield operation, using a low pass filter to produce a first dataset; decomposing the measurement data using a high pass filter to produce a second dataset; removing distortions from the second dataset to yield a corrected second dataset; and reconstructing a corrected dataset from the first dataset and the corrected second dataset. The method may further includes compressing the reconstructed dataset.

In another aspect, the present invention relates to computer readable media. A computer readable medium in accordance with one embodiment of the invention stores a program having instructions for: transforming measurement data acquired in an oilfield operation into a different domain to produce transformed data; identifying distortions from the transformed data; and removing the distortions from the transformed data to produce cleaned-up data. The program may further include instructions for compressing the cleaned-up data or reconstructing signals from the cleaned-up data.

In another aspect, the present invention relates to a system for data processing that includes a processor and a memory, wherein the memory stores a program having instructions for: transforming measurement data acquired in an oilfield operation into a different domain to produce transformed data; identifying distortions from the transformed data; and removing the distortions from the transformed data to produce cleaned-up data. The system for data processing may be disposed on a formation tester.

Other aspects and advantages of the invention will become apparent from the following description and the attached claims.

BRIEF SUMMARY OF THE DRAWINGS

FIGS. 3A and 3B show comparisons or raw GOR data and processed data.

FIG. 4 shows a histogram of wavelet coefficient distribution.

FIG. 5 shows a pressure signal from an FPWD measurement.

FIGS. 6A and 6B illustrate a data processing method of the invention for the data shown in FIG. 5.

Figure 1:
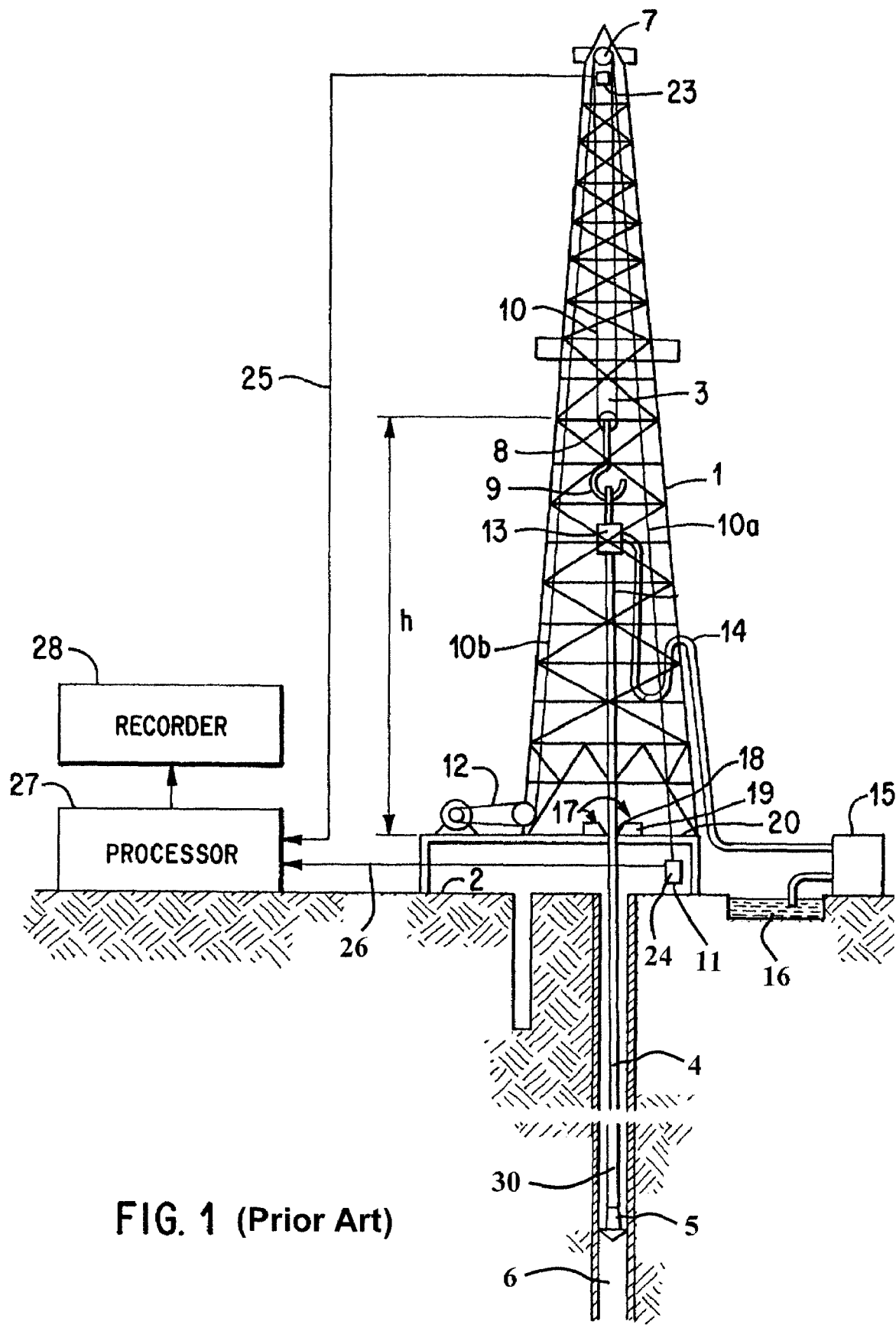
FIG. 1 shows a conventional drilling system with an LWD tool in a bore hole.

It is to be understood that the drawings are to be used for the purpose of illustration only, and not as a definition of the metes and bounds of the invention, or as a basis for reading non-existent or un-recited limitations into the claims.

DETAILED DESCRIPTION

Embodiments of the invention relate to methods and systems for data processing, including time series data processing. Embodiments of the invention are particularly useful in processing data obtained from well logging, such as the time series data acquired with a formation fluid tester, such as the MDT® or StethoScope® from Schlumberger Technology Corporation. For clarity, the following description will use data form a formation tester to illustrate embodiments of the invention. However, one of ordinary skill in the art would appreciate that embodiments of the invention may also be applied to other types of data.

Methods of the invention can improve the quality and ease of interpretation of time series data. Each time series data may be called a channel. Each channel consists of measurements or computations of a particular property. Such measurements are typically made at regularly spaced time intervals.

Measurement channels from current generation formation testers (such as the MDT®) may include fluid optical densities, fluid fluorescence emission levels, pressures, temperatures, fluid resistivities and pump motor speeds. Computation channels from current generation formation testers may include water fraction, hydrocarbon Gas-Oil Ratio (GOR), and hydrocarbon compositions. Future generation formation testers are expected to include many additional measurement and computation channels. The large volume of data will require significant bandwidth to transmit, which will be problematic in measurement-while-drilling (MWD) environments, because the current state of telemetry does not have enough bandwidth to transmit such a large volume of data.

Thus, in oilfield data processing, data compression is often necessary to facilitate computation, transmission and/or storage. Data compression typically use fewer data points to represent the whole dataset. These representative data points should maintain the essential characteristics of the whole dataset.

Data acquired in oilfield operations are often too noisy to permit easy selection of representative data points (see for example, the time-series data shown in FIG. 3A). The high noise (i.e., low signal-to-noise ratio) in these data results from the fact that the signals of interest are typically very weak. Noisy data are not amenable to trend analysis or selection of representative data points because the noises may mask the signals and the data trend. Thus, noise removal is often as important as, if not more important than, data compression in processing oilfield data. Therefore, in accordance with embodiments of the invention, a method for data processing may include noise removal and data compression. These compressed data, for example, may then be transmitted and uncompressed before analysis or other applications.

Noises typically manifest themselves as random amplitude perturbations in the time series signals. Thus, noises have characteristics (e.g., amplitude vs. time) that have "apparently" identical properties as the properties of the signals in the time series data. This fact makes it difficult or impossible to distinguish noises from signals in the raw data.

To facilitate noise identification and removal, embodiments of the invention convert (or transform) measurement data, using a proper transformation function, into a dimension/domain different from the original dimension/domain such that the signals and the noises have different characteristics. For example, time domain data may be converted into frequency domain data, or vice versa, by Fourier Transformation (FT). In the frequency domain, the signals can typically be identified as peaks at discrete frequencies with significant amplitudes, while the noises typically spread all over the frequency range and have relatively low amplitudes. Therefore, the signals and noises that comingle in the time domain may become readily discernable in the frequency domain. Wavelet transforms operate by a similar principle: time domain data is converted to wavelet domain data, then distortions are easily identified and removed.

Figure 2A:
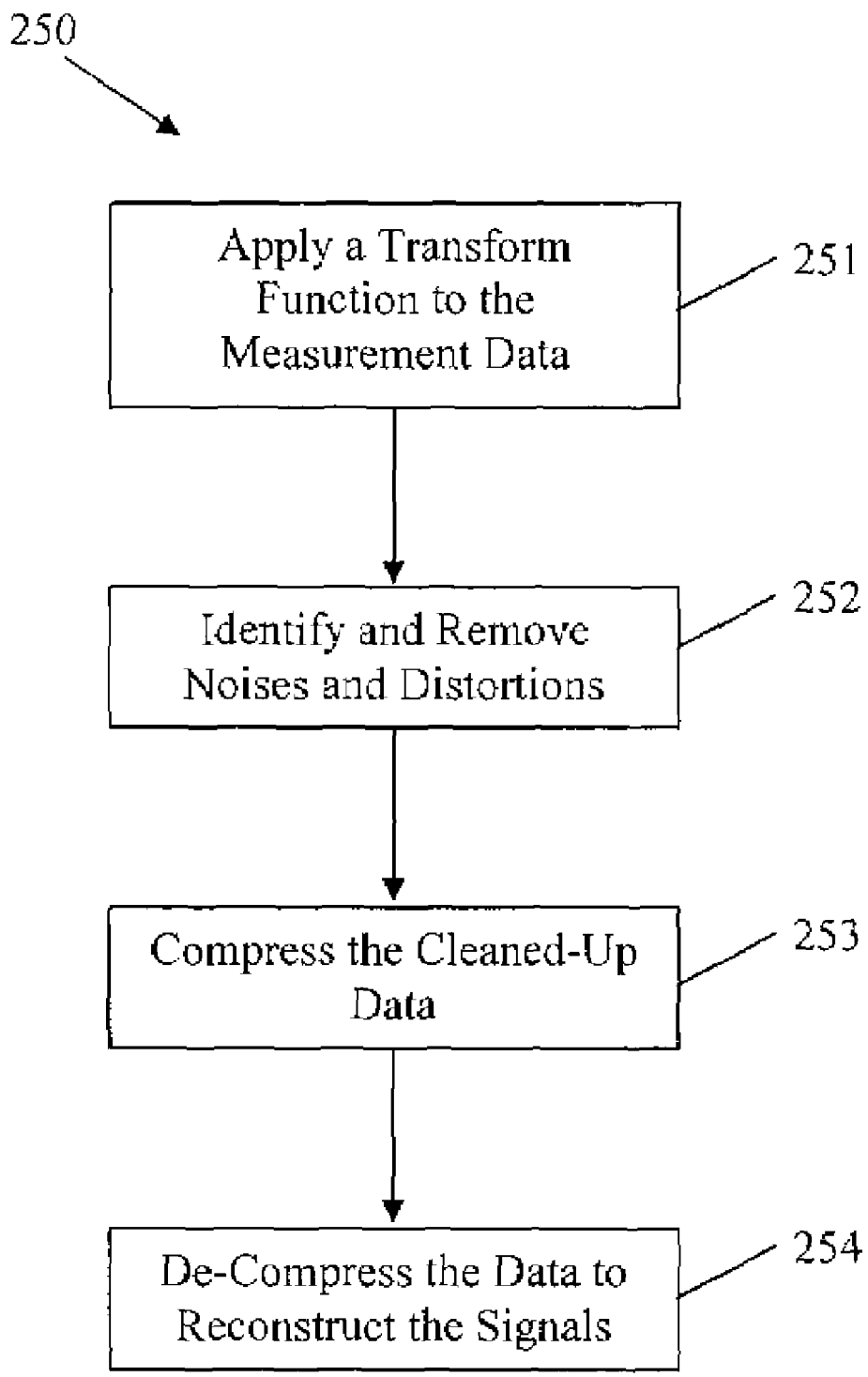
FIGS. 2A and 2B illustrate two methods of processing data in accordance with embodiments of the invention.

An example of a general method in accordance with embodiments of the invention is illustrated as in FIG. 2A. As shown in FIG. 2A, a method 250 of the invention may first apply a transformation function to the measurement data (step 251). The transformation typically converts the data into a different domain such that the signals of interest and the noises become distinguishable. In accordance with embodiments of the invention, any suitable transformation function may be used as long as noises and signals would behave differently after the transformation. Examples of such transformation functions may include Fourier Transformation (FT) and various Wavelet Transformation (WT), including Continuous Wavelet Transform, Discrete Wavelet Transformation (DWT), Complex Wavelet Transform, and the like.

After the transformation, the noises or distortions are identified and removed (step 252). One of ordinary skill in the art would appreciate that the exact methods for identifying and removing the noises may depend on the transform functions used. For example, time-series data may be transformed using a discrete wavelet transform to permit the distinction between the signals and noises (or other distortions). After a discrete wavelet transform, the true signals associated with a gradually changing process will manifest themselves as wavelets having coefficients that cluster in a normal distribution. On the other hand, noises or distortions would likely have coefficients that do not belong to the same group as the signals. Therefore, noises and distortions can be identified by their unique distribution of wavelet coefficients.

Once the data are cleaned up, they may be compressed (step 253). Any suitable compression method known in the art may be used. The compressed data can be transmitted more efficiently to the surface via telemetry or to a remote site via a network. In some operations, de-noised and/or compressed data may be used downhole for real-time needs, without being transmitted uphole.

The compressed data may be decompressed to reconstruct the signals at a later stage, if desired (step 254). The clean, compressed data may be uncompressed, typically on the surface or in a remote location, to reconstruct the signals in order to facilitate the examination of the formation properties.

Because the de-noised data and/or the reconstructed signals are free from noises and distortions, useful information may be more readily derived from these data. For example, information such as the pressure and the gas-oil ratio (GOR) of a hydrocarbon reservoir can be readily derived from the reconstructed signals produced by methods of the invention. In addition, trends in the data, for example, whether the pressure and the GOR are changing as formation tester pumps fluids into a well bore, can also be identified more easily with the cleaner, reconstructed signals. These trends are important for making decisions with respect to drilling and logging activities. Further, discrete events can be detected. The discrete events may include, e.g., pressure spikes, embedded free-gas bubbles in an oil stream, etc.

With respect to applying a transform function to raw data (Step 251 in FIG. 2A), various transform functions may be used, including Fourier transformation and wavelet transformations as noted above. In addition, with some datasets, it might be more efficient to pre-process the data such that the noises can be more readily identified or the noise removal only needs to be applied to part of the data.

Figure 2B:
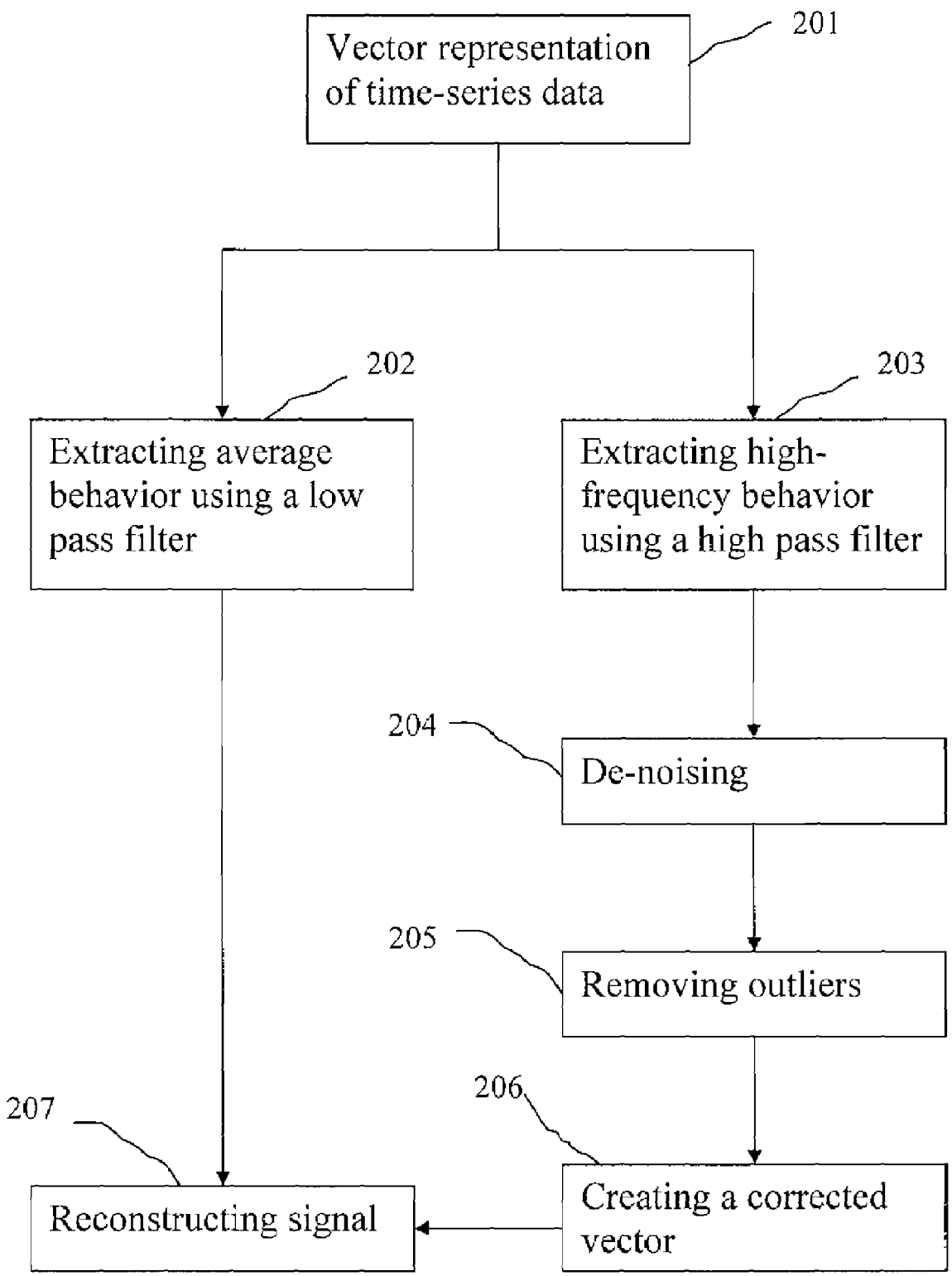

For example, FIG. 2B shows a data processing method in accordance one embodiment of the invention that involves using a low-pass filter and a high-pass filter to decompose the dataset into two subsets. As an example, FIG. 2B shows a method applied to time-series data (such as those acquired with a formation tester), which may be represented by a one-dimensional vector of values (shown as 201). The vector may be referred to as $S^{obs}$. In accordance with embodiments of the invention, the vector $S^{obs}$ may be decomposed using a low-pass filter G to extract a vector C (step 202), or using a high pass filter H to extract a vector D (step 203). The vector C represents the low-frequency, or average, behavior of the signals, while the vector D represents the high frequency behavior of the signals.

The high frequency vector D typically contains most of the distortions to the signals, which may include noises and/or outliers. Therefore, vector D may be subsequently examined to remove signal distortions. Noises are generally low-magnitude, random, and are usually uncorrelated errors, which may be removed in step 204. Any suitable noise filtering methods known in the art may be used. Examples of how to use coefficients from wavelet transforms to aid noise removal will be described in detail later. Note that the criteria used to define noise may be process specific, and may depend on a predetermined threshold.

In step 205, data outliers may also be removed. The outliers are typically large-amplitude, short-lived distortions to the signals, often resulting from the system that generates the signals. Thus, it may be desirable to remove the outliers such that they do not skew the "true" signals. Note that the criteria used to define an outlier may be process specific, and may depend on a predetermined threshold. In general, discrete wavelet transforms (DWT) can be used to identify outliers by their "outlying" distributions of the wavelet coefficients (WC's). However, other suitable methods may also be used to identify outliers. Examples of using DWT to identify outliers will be illustrated later.

After correcting the noises and outliers from vector D, a vector $D^{corrected}$ is created that better represents the high-frequency behavior of the underlying signals (step 206). From $D^{corrected}$ and C, a more accurate representation $S^{corrected}$ of the signal may be re-constructed (step 207).

Although the filters H and G mentioned above can be generated using various transforms, including Fourier Transforms, in accordance with some embodiments of the invention, preferably Discrete Wavelet Transformations (DWT's) are used. A general introduction to DWT is given by Mallat, "*A Theory for Multiresolution Signal Decomposition. The Wavelet Representration*," IEEE Trans. Pattern Analysis and Machine Intelligence (July 1989) vol. 11, no. 7, p. 674.

Unlike Fourier Transforms, which use periodic waves, Wavelet Transforms use localized waves and are more suitable for transient analysis because different resolutions at different frequencies are possible. The filters H and G mentioned above may be derived from Discrete Wavelet Transformations (DWT). DWT is the most appropriate for removing the types of random noise and other distortions in signals generated by formation testers. In some cases, when DWT is not the most appropriate approach to the generation of filters H and G mentioned above, other approaches such as Fourier Transformations may be used.

When a DWT is applied, the vector D described above contains the wavelet coefficients (WC's) and the vector C described above contains the scaling function coefficients (SC's). The basic DWT may be illustrated by the following equations (1) and (2):

$$D_{HIGH}(n) = \sum_{k=-\infty}^{\infty} S(k)H(n-k), \tag{1}$$

$$C_{LOW}(n) = \sum_{k=-\infty}^{\infty} S(k)G(n-k). \quad (2)$$

For efficient DWT, the signal S(k) should contain $2^j$ data values. A vector S having $2^j$ values is referred to as vector of level j. The vectors C and D shown above each will contain $2^{j-1}$ values, and, therefore, they are at level j−1. Thus, the DWT shown in equations (1) and (2) decomposes the input signal S(k) by one level. The decomposition can be iterated down to any desired level.

In accordance with embodiments of the invention, specific types of wavelet functions may be chosen according to the types of data to be processed. Commonly used wavelet functions include Haar, Daubechies, Coiflet, Symlet, Meyer, Morlet, and Mexican Hat. In accordance with some embodiments of the invention, the Haar wavelet functions are used to detect discrete events, such as the presence of gas bubbles and the start of pressure transients (such as the start of drawdown and buildup), while the Daubechics wavelets are used to detect trends in the signals because these wavelets can generate smooth reconstructed signals.

In accordance with embodiments of the invention, wavelets may be adapted to deal with all types of data, including those from formation testers. In addition, the wavelet processing may be applied in real time, i.e., as the data is being generated. Alternatively, wavelet processing may be performed on data that have been previously collected and stored.

For H and G derived from DWT, de-noising algorithms may be chosen to be specific to the wavelets used in the DWT. In accordance with some embodiments of the invention, algorithms based-on local maxima may be used to remove white noise. These algorithms have been described in Mallat and Hwang, "*Singularity Detection and Processing with Wavelets*," IEEE Trans. Info. Theory (1992) vol. 38, no. 2, p. 617.

In accordance with some embodiments of the invention, threshold-based wavelet shrinkage algorithms may be used for noise reduction. These algorithms are given in David L. Donoho and Iain M, Johnstone, "*Ideal Spatial Adaptation via Wavelet Shrinkage*," Biometrika, 81(3), 425-455 (1994).

In accordance with some embodiments of the invention, the algorithms that are most appropriate for denoising a signal may be chosen after appropriate statistical techniques (tools) have been applied to identify the structure of the noises. Such statistical tools, for example, may include histograms of the wavelet coefficients (see e.g., FIG. 4 below), which provide understanding of the spread and mean of the noises, and plots of the autocorrelation of the wavelet coefficients, as these provide understanding of the time structure of distortions on the signals.

In addition to noises, outliers may also need to be removed. As noted above, outliers are aberrations in the data, which are generally larger in magnitudes than noises. When DWT is used to decompose a signal, outliers will manifest themselves as large, isolated wavelet coefficients. Therefore, outliers can be readily identified and removed from the signals.

After removal of the distortions (noises and outliers), signal compression and decompression may be performed using a suitable wavelet transform. As noted above, the appropriate wavelet transforms to be used may depend on the types of data to be processed. For example, for data relating to GOR collected with a formation tester, wavelet lifting techniques may be appropriate. A general description of the wavelet lifting techniques can be found in Sweldens, "*The lifting scheme. A construction of second generation wavelets*," SIAM J. Math. Anal., vol. 29, no. 2, pp. 511-546, 1997. Alternatively, other algorithms, such as those described by Ziv and Lempel, "*A Universal Algorithm for Sequential Data Compression*," IEEE Transactions on Information Theory, vol. 23, no. 3, pp. 337-343, may also be used.

FIGS. 3A and 3B show an example illustrating the utility of embodiments of the invention. In FIG. 3A, the noisy curve 301 represents unprocessed recording of GOR as a function of time. The raw data shown as 301 include 8192 data points, representing 8192 numbers. After removal of distortions (noises and outliers) from the signals and compression of the data (using wavelet transformation as described above), the information in the 8192 data points can be represented by 28 numbers, which can be used to reconstruct a full clean trace 302.

In FIG. 3B, the second half of the same data trace 301 is shown. The raw data are represented by 4096 data points. After de-noising and compression, the information contained in these 4096 data points can be accurately represented by 6 data points, as evidenced by the clean trace 303 reconstructed from the 6 data points.

The example shown in FIGS. 3A and 3B illustrate the efficiency of data compression using wavelet transformations in accordance with embodiments of the invention. It can be seen from FIG. 3A that the main signal that is represented by 8192 data points, after distortion removal and compression, can be satisfactorily represented by 28 numbers. This corresponds to a compression ratio of 8192/28=293. An even higher compression ratio, 4096/6=683 can be achieved for the second half of the signal, as shown in FIG. 3B.

Such high compression will facilitate data transmission and provide efficient storage and retrieval of the data/signals. The compressed data will greatly benefit data transfer from the well bore to the surface and vice versa, using, e.g., mud pulse telemetry, and data transfer from drilling site to a remote office. In the latter case, remote monitoring is greatly facilitated because the compressed signals can be readily transmitted over a network (such as the Internet) and then readily reconstructed at the monitor site. The bandwidth of today's Internet still imposes severe limitations on sending the large volume of uncompressed raw data typically acquired in hydrocarbon exploration and production. However, in accordance with embodiments of the invention, these data can be compressed such that they can be sent easily over the Internet, allowing a real time monitoring and controlling of well operations.

For example, methods of the invention may improve the ability of a user to remotely monitor a formation testing job from a location (office) that is removed from the rig where the testing is being performed. Remote monitoring, for example, may be achieved by sending formation testing signals, after data compression, over the Internet, from the rig to the office. Currently, the internet has insufficient bandwidth to transmit all formation testing signals that are desired for remote monitoring. Methods of the invention can be used to compress the formation testing signals in order to allow formation tester signals to be efficiently sent over the internet.

Methods of the invention (e.g., de-noising and compression illustrated in FIGS. 3A and 3B) not only improve the efficiency of data transfer and storage, but also make it easier to see the trend in the data using the smooth curve 302 instead of using the noisy raw data 301. Thus, the clarify of interpreting operational reports is greatly improved.

As noted above, statistical methods may be used to identify noise structures. Based on the structure of the noises, an appropriate algorithm for de-noising can then be selected. An exemplary statistical method for identifying the structure of the noise is a histogram, as shown in FIG. 4. In this example, a histogram 401, corresponding to the distribution of wavelet coefficients for the GOR trace 301 of FIG. 3B, is shown.

The histogram 401 indicates that while the bulk of the wavelet coefficients cluster in a group having an apparently normal distribution, the histogram also includes an outlier 403 that is very different from the remaining coefficients. As noted above, outliers are aberrations in the data, which are larger in magnitude than noise. When DWT is used to decompose a signal, outliers will manifested themselves as large, isolated wavelet coefficients, as exemplified by outlier 403. Since these outliers are readily identified, they can be easily removed from the signals. In some cases, such "apparent outliers" may carry useful information; one such example will be discussed below with respect to pressure drawdown and buildup analysis.

If one ignores the outlier 403, the distribution of the remaining wavelet coefficients can be fit to a standard distribution that can be defined by a smooth curve 402. From the analysis of such distributions, statistical properties of the wavelet coefficients, such as the mean and the standard deviation, can be derived. Depending on the situations, one may define a threshold limit (e.g., 2 or 3 times the standard deviation), beyond which the coefficients are considered to belong to the noises. Furthermore, autocorrelations of the wavelet coefficients may also be studied to help understand temporal structures of the noise.

The example shown in FIG. 3A and FIG. 3B illustrates efficient data compression that can be achieved with embodiments of the invention. The compression and decompression of such data also allows for improved interpretation of the signals. The values of GOR versus time and the trend in the GOR are much easier to deduce from the reconstructed, smooth curves than from the raw data, noisy curves. In addition, these methods also increase the confidence of the reader in the quality of interpretation reports by increasing the clarity of the reported signals.

Methods in accordance with embodiments the invention may be used to compress signals (e.g., pressure or GOR signals from a formation tester) such that the storage and retrieval of these signals by computers is made more efficient. In addition to the compression of a GOR signals illustrated in FIGS. 3A and 3B, further examples of applications of embodiments of the invention in the compression of pressure traces (see FIGS. 9A, 9B, 9C, 10A, 10B, and 10C) and Live Fluid Analyzer Oil Fraction traces (See FIGS. 14A and 14B) will be described later.

Embodiments the invention have various applications, such as to remove distortions in signals; to improve the quality of jobs (such as formation testing) performed during a drilling operation; to detect the presence of multi-phase flows in the flow line of a formation tester, as it pumps fluids; to improve the quality of the curves which are computed from raw formation tester signals, to name a few.

Some of these applications will be illustrated using a formation testing operation performed downhole. A formation tester may be lowered into a borehole on a wireline. Alternatively, a formation tester may be part of a bottom hole assembly (BHA) attached to a drill string. When the formation tester is part of a BHA, it can perform formation testing while drilling (FTWD) measurements. Currently, FTWD signals can only be sent to the surface as encoded pressure pulses in the drilling mud, using the mud pulse telemetry. This method of data transmission (mud pulse telemetry) has an extremely narrow bandwidth (less than 10 bits per second). However, there is currently no good alternative to the mud pulse telemetry for measurement-while-drilling (MWD) or logging-while-drilling (LWD) applications. Because it is often necessary to monitor the FTWD signals from the surface at various times, before the formation tester returns to surface, users often have to put up with the limited bandwidth of the mud pulse telemetry. Therefore, it is important to minimize the size of FTWD signals before they are sent to the surface. Several embodiments of this invention can accomplish this objective.

The current generation of FTWD measurements can only measure formation pressures. This type of pressure measurements is referred to as Formation Pressure While Drilling (FPWD). See J. Pop et al., "*Operations Aspects of Formation Pressure Measurements While Drilling*," paper SPE/IADC 92494, presented at the SPE/IADC conference, Amsterdam, Feb. 23-25, 2005, for a description of an FPWD process. In the future, the FTWD measurements may expand to include many more measurements, such as optical absorption spectroscopy measurements that can be used to compute Gas-to-Oil ratio (GOR). The GOR measurements are currently made with wireline conveyed formation testers. See C. Dong et al., "*Downhole Measurement of Methane Content and GOR in Formation Fluid Samples*," paper SPE 81481, presented at the 13th Middle East Oil Show & Conference, Bahrain, Apr. 5-8, 2003.

Methods of the invention may be used downhole to remove the distortions to these data and/or to compress the data. The processed data may then be used downhole to control downhole operations or sent to the surface for further analysis and use. In accordance with some embodiments of the invention, distortions to FPWD signals may be removed, and events from the signals may be recognized (detected). The resulting filtered signals, together with information about the events, can then be used downhole by the computer in the formation tester to make inferences from the measurements. Because distortions have been removed, the filtered signals may be viewed as a compressed version of the unfiltered signals. The filtered signals may then be further compressed by techniques such as wavelet lifting in accordance with embodiments of the invention, before being sent to the surface, where it will be analyzed (by people and/or algorithms running on computers). An example of how this is accomplished is given below.

Referring to FIG. 5, a raw FPWD pressure vs. time trace is shown as a noisy curve 501. The curve 501 includes $2^{11}$=2048 data points. Thus, the curve 501 is of level 11. The oscillations in the data are caused by the mud pumps being on during the measurement. Such oscillating noise may be filtered out before further processing. A less noisy curve may be needed to determine the rate of change of pressure with respect to time.

In an exemplary analysis using methods of the invention, the starts of drawdown (DD) and buildup (BU) in the trace 501 are first identified. Wavelet coefficients (WC's) may be used to detect the starts of drawdown and buildup. For example, this may be achieved by applying a Haar DWT to the signals, and examining the WC's at level 10, i.e., after just one level of decomposition.

Because the starts of the drawdown and buildup manifest themselves as sudden, large changes in the pressure transients, these events will appear as if they were outliers. The magnitudes of changes are typically larger than 2 standard deviations of a normal WC's distribution. However, the starts of pressure transients (drawdown and buildup) can be distinguished from true outliers in the following manner. The abrupt changes associated with drawdowns and buildups are followed by a gradual monotonic changes in the values of WC's. On the other hand, an outlier is simply an aberration that is associated with a sudden change of the WC's, but not the gradually changes afterwards. The plots shown in FIG. 6A illustrate the features of the WC's of the signal 501 in FIG. 5, decomposed by 1 level (to level 10). FIG. 6B shows the start of drawdown and buildups.

Referring to FIG. 6A, a histogram 601 is plotted for the Haar wavelet coefficient distribution calculated from the signal 501. A normal distribution curve 602 may be fitted from the histogram 601. Other types of distributions may be used in place of the normal distribution. "Outliers" defined by WC values larger than a predetermined threshold (e.g., 2 standard deviations) are identified in a region 603. These "outliers" are associated with the start of buildup 604 in the curve 605 obtained from Haar DWT (see FIG. 6B). Similarly, outliers defined by values smaller than a predetermined threshold (e.g., 2 standard deviations) are identified in a region 606. These "outliers" are associated with the start of drawdown 607 in the curve 605 obtained from Haar DWT (see FIG. 6B).

Once the special events (e.g., drawdown and buildup) are identified, the trace 501 of FIG. 5 may be filtered to remove unwanted noise, using wavelets in the manner described above. Note that the pressure trace 501 shown in FIG. 5 has oscillatory perturbations. These are caused by the fact that mud pump was in operation while the measurements were made. These perturbations are considered noises and may be filtered out to facilitate further analyses. Such analyses, for example, may include: a) determining a representative (i.e., undistorted) pressure at the end of the test; b) determining the rate of change of this pressure with respect to time; and c) determining the shape of the curve of the derivative with respect to Horner time of the (representative) buildup pressure. Furthermore, this curve may be used to determine whether the buildup entered an infinite acting spherical flow (IASF) or an infinite acting radial flow (IARF) regime. If these flow regimes exist, then the build up pressures may be extrapolated by special techniques to determine the representative pressure. More description about Horner time, IASF, IARF and related issues may be found in L. P. Dake, "*Fundamentals of Reservoir Engineering*," Elsevier Scientific Publishing Co., Amsterdam, 1978.

Methods in accordance with embodiments of the invention may include the use of appropriate diagnostic tools to optimize the application of the methods. For example, a Daubechies (par=4) DWT may be applied to the signal to allow one to infer the probable range of noise values, and the maximum decomposition level to which denoising can be applied. The par parameter of a wavelet function refers to the number of values of a signal S which are used when S is transformed by 1 level. Thus, Daubechies (par=4) refers to the version of the Daubechies wavelet transform which uses 4 values in a signal when transforming the signal to the next level. One way to assess probable range of noises is to look at how the mean and standard deviation (stdev) of a normal distribution of the wavelet coefficients vary with respect to the level of decomposition.

Figure 7A:
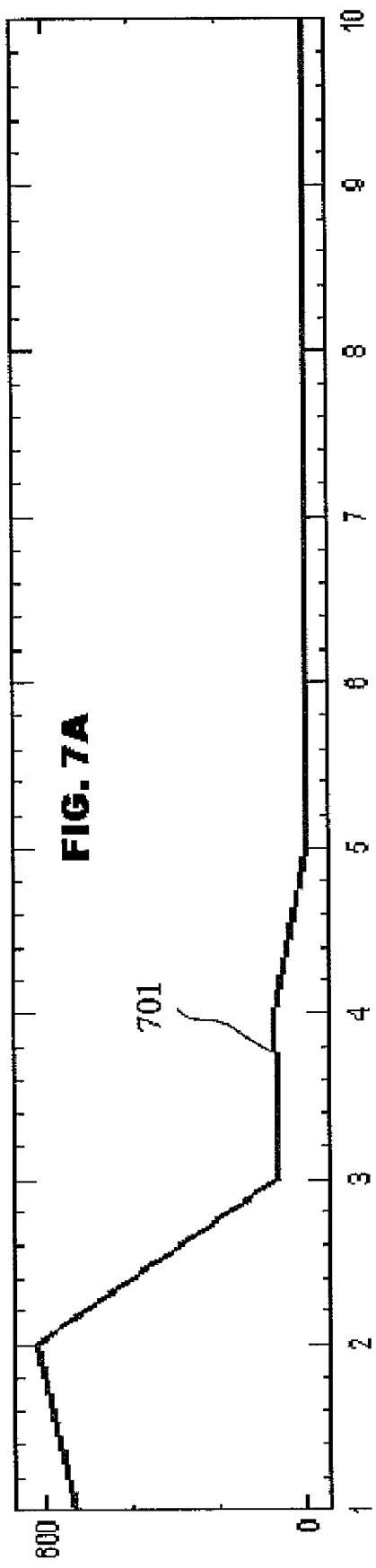
FIGS. 7A and 7B show mean and standard deviation as functions of decomposition levels for the pressure data of FIG. 5.
Figure 7B:
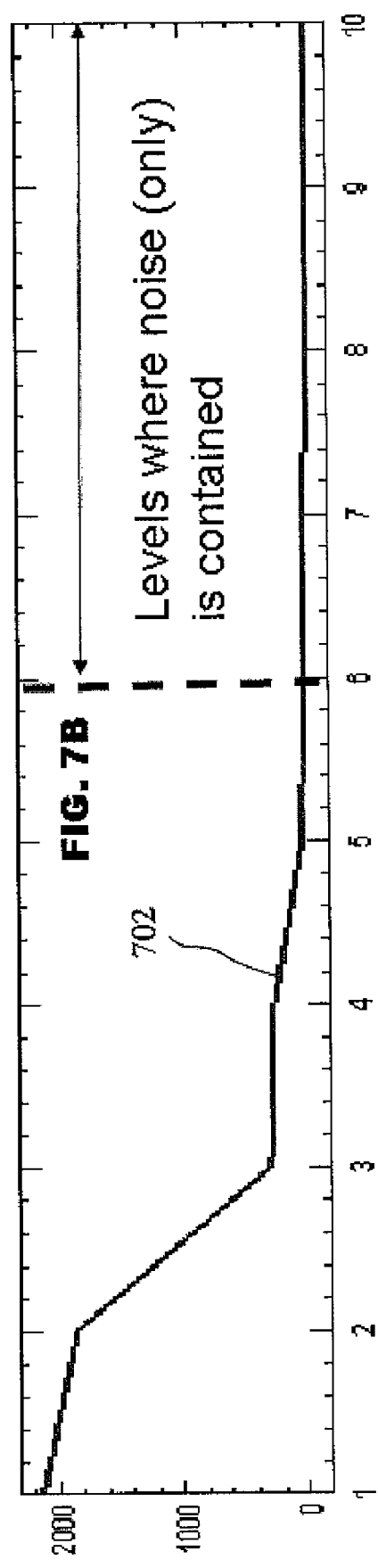

FIGS. 7A and 7B illustrate this approach using the pressure curve 501 of FIG. 5. FIG. 7A shows curve 701 that represents mean vs. decomposition level. It can be seen that the mean is close to zero after level 5. As shown in FIG. 7B, the standard deviation vs. decomposition level curve 702 is close to zero after level 6. Therefore, it may be concluded that there is an acceptably low level of risk in filtering out noise down to a level 6. However, the risk becomes unacceptable below level 6. Thus, filtering may be performed on WC's down to and including decomposition level 6 in this particular example.

Figure 8:
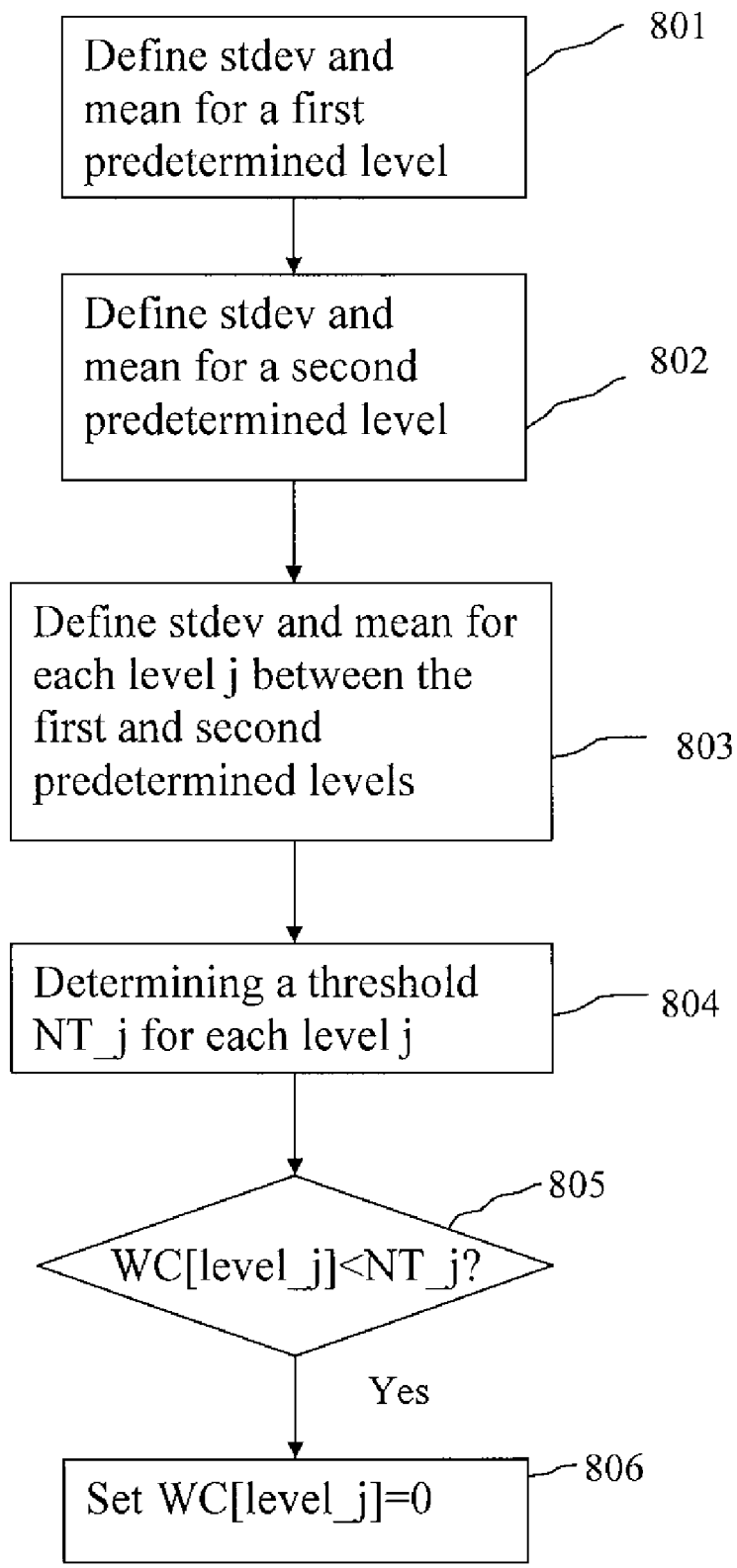
FIG. 8 shows an algorithm for a filtering technique in accordance with an embodiment of the invention.

The methods described above may be implemented by various approaches. An exemplary algorithm is described below with reference to FIG. 8. In step 801, a standard deviation (stdev) and a mean for the wavelet coefficients of a first predetermined level (e.g., level 10) are defined:

Define Stdev_10=stdev (WC[level 10]) and Mean_10=mean (WC[level 10]).

In step 802, a standard deviation and a mean of a second predetermined level (e.g., level 6) are defined:

Define Stdev_6=stdev (WC[level 6]) and Mean_6=mean (WC[level 6]).

In step 803, for each level between the first predetermined level and the second predetermined level, i.e., j=6, ..., 10, a standard deviation and a mean are defined:

Define Stdev_j=stdev(WC[level j]) and Mean_j=mean(WC[level j]).

Subsequently in step 804, a noise threshold NT_j is determined by:

Set NT_j=NT_10*(Stdev_j−Mean_j)/(Stdev_10−Mean_10), wherein NT_10 is a predetermined value, e.g., 2 times the value of stdev(WC[level_10]).

In step 805, if any of the WC's at a particular level j=6, ..., 10, is less than the associated noise threshold NT_j, then set the WC to zero in step 806.

Figure 9:
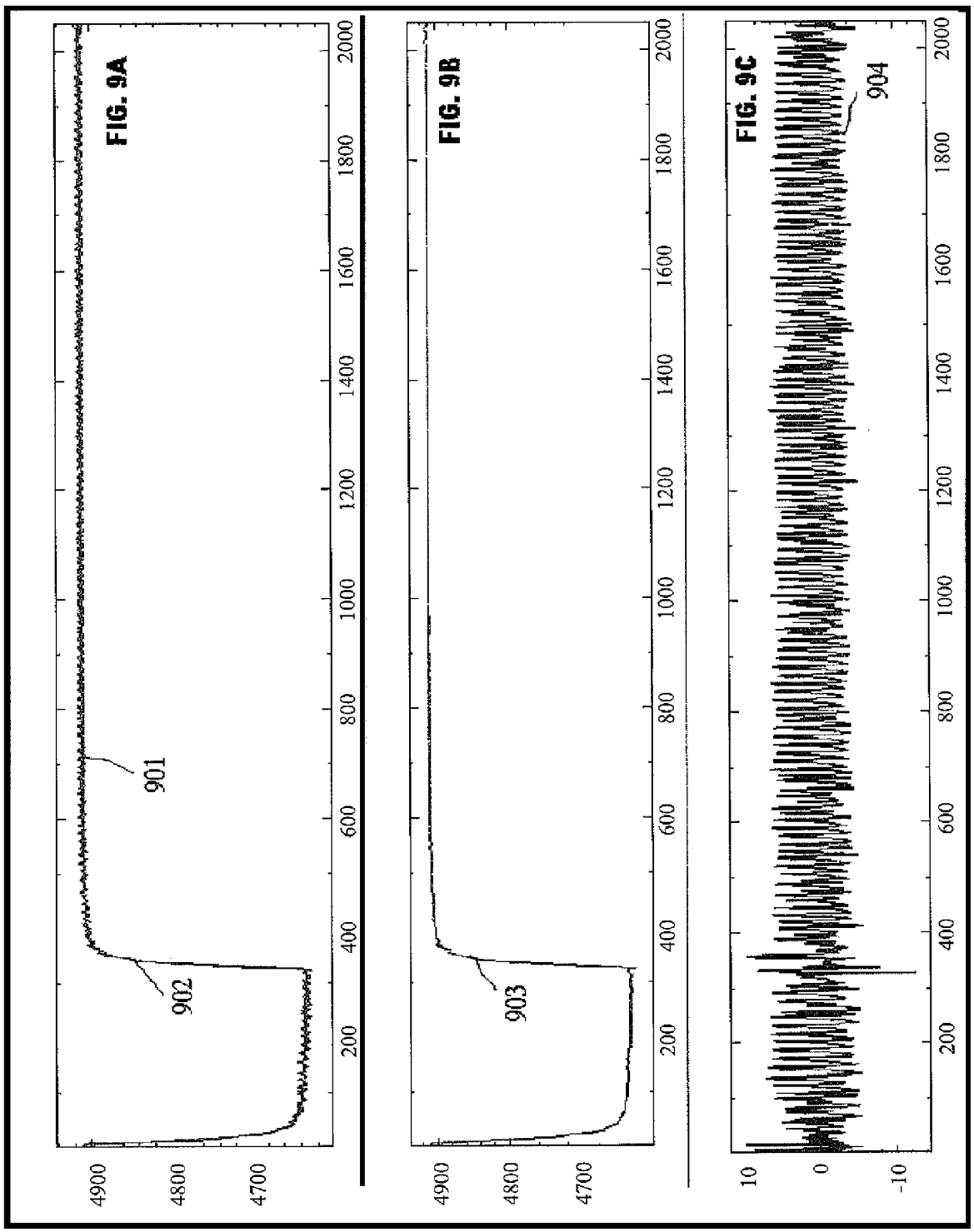
FIGS. 9A, 9B, and 9C show results of filtering of the data from FIG. 5.

Application of this noise reduction algorithm is illustrated in FIGS. 9A-9C. FIG. 9A shows a noisy, raw data trace 901 overlapped with a reconstructed, smooth signal curve 902. The reconstructed signal curve 902 was reconstructed from 179 non-zero numbers that have been noise-filtered. These two curves overlap very well, except that the reconstructed curve 902 is devoid of the wavy noise that arose from the action of the mud pump. Thus, the difference between the reconstructed signal curve 902 and the raw data curve 901 is a wavy line 904 shown in FIG. 9C. FIG. 9B shows a low-pass signal curve 903 at level 6, i.e., the vector C produced by applying a low-pass filter G noted above.

Figure 10:
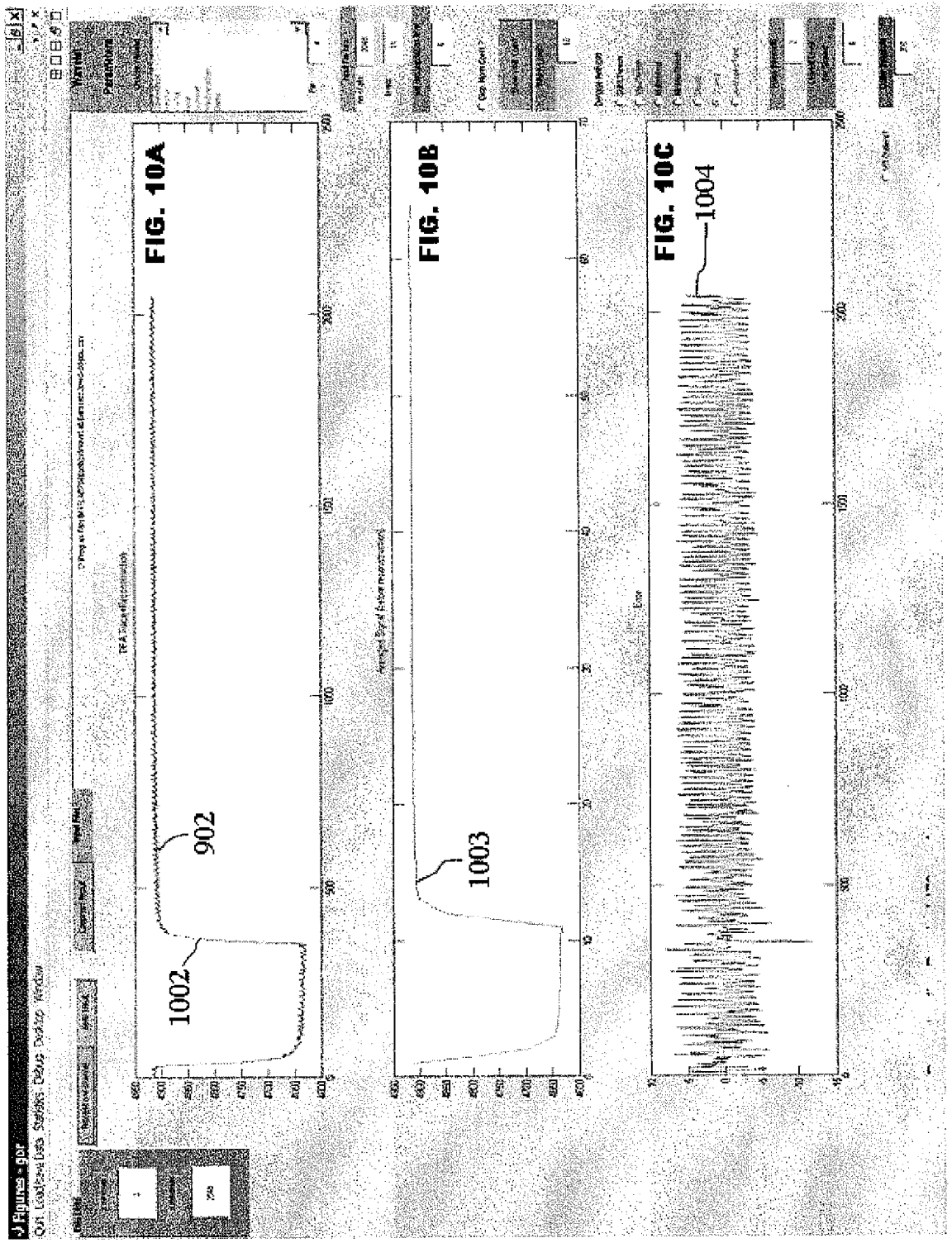
FIGS. 10A, 10B, and 10C show results of further filtering of the processed data from FIGS. 9A, 9B, and 9C.

FIG. 10A shows further filtering of the reconstructed signal 902 from FIG. 9A. The slight roughness in the curve 902 is further reduced in the further-filtered curve 1002. The filtering process includes applying a DWT with Coiflet (par=4) wavelets, which are variations of Daubechies wavelets, to the input signal 902, and de-noising the resulting WC's by the well known multi-hybrid method (down to level 6). The further-filtered signal 1002 was reconstructed with only 88 non-zero numbers, while the filtered signal 902 was reconstructed with 179 non-zero numbers. The low-pass signal 1003 at level 6, i.e., the vector C created by the low-pass filter G, is shown in FIG. 10B. The difference between the input signal 902 and the further-filtered signal 1002 is shown as the curve 1004 in FIG. 10C.

Figure 11:
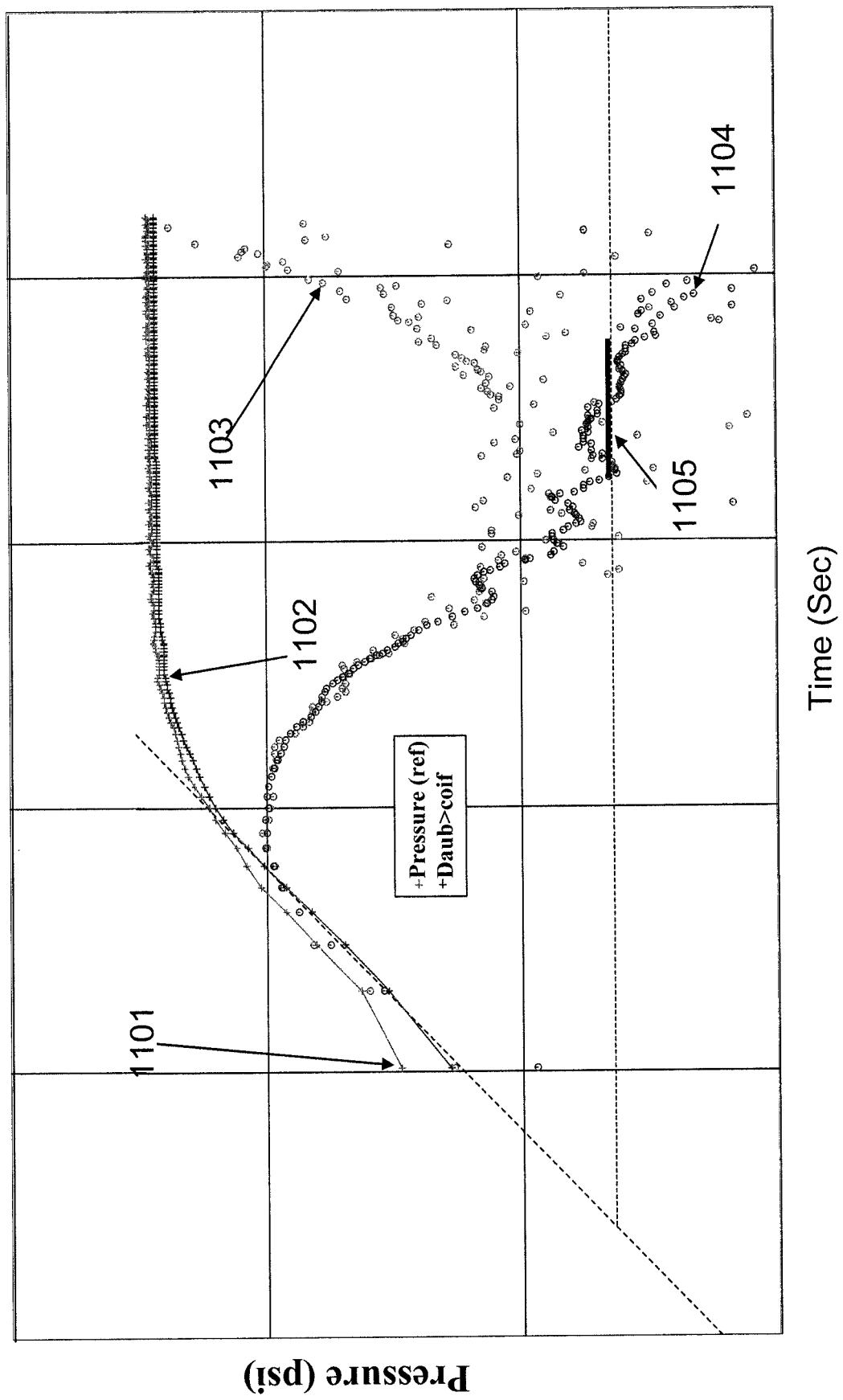
FIG. 11 demonstrates the use of reconstructed signal in detecting IARF (Infinite Acting Radial Flow).
Figure 12:
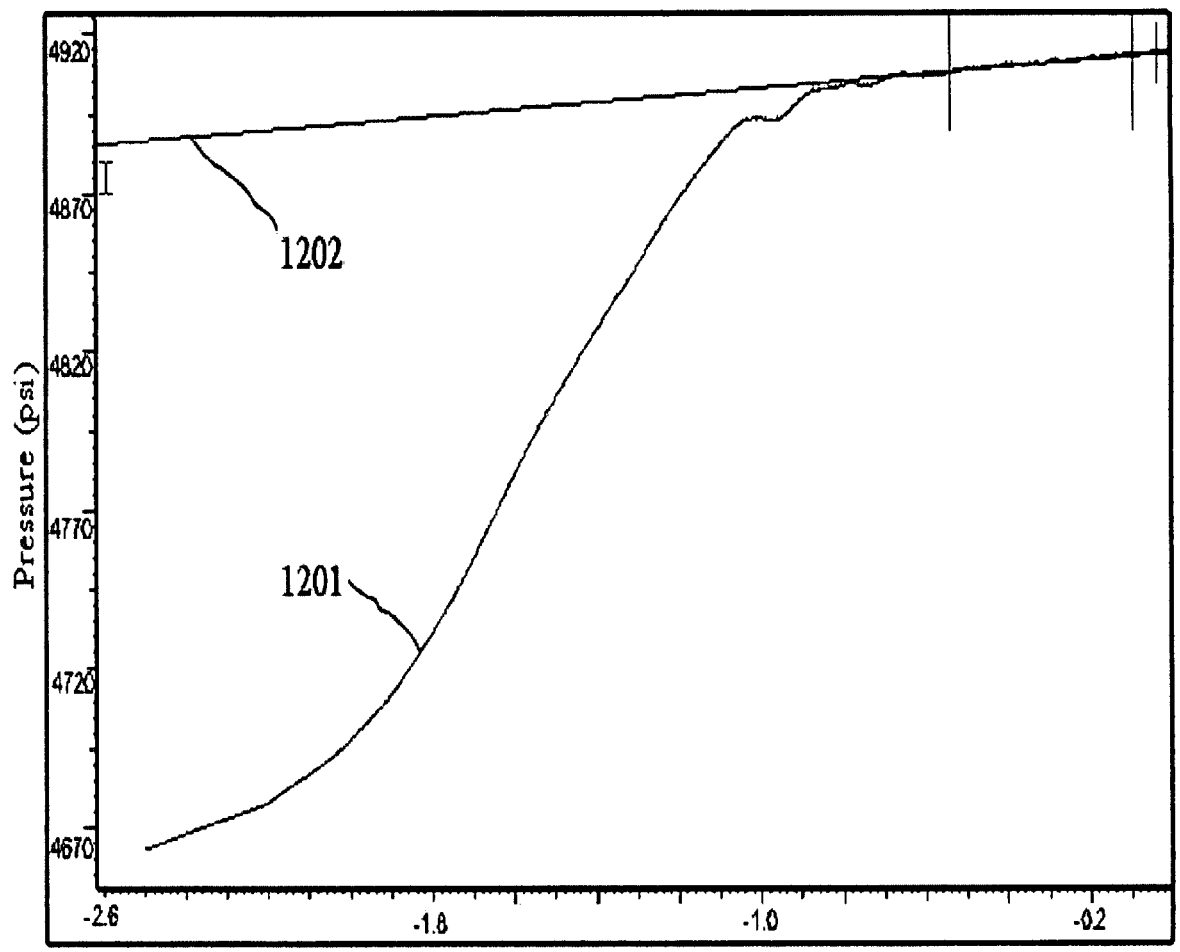
FIG. 12 shows an extrapolation of pressure data from the reconstructed signal.

The further-filtered signal 1002 provides easier interpretation of the data. The pressure of the final reconstructed signal reached an average value of 4913.15 psi in the last 100 seconds of the buildup, and the variation was ±0.15 psi. This pressure can be checked by extrapolation because the IARF regime can be detected in the buildup derivative of the final reconstructed signal, as shown in FIG. 11. The pressure extrapolation from the clean buildup curve, as shown in FIG. 12, yielded a reservoir pressure of 4914.1 psi, which is close to 4913.15 psi which is obtained from analyzing curve 1002, is within the accuracy of the FPWD gauge used to measure the pressures.

The filtered signal curves are much smoother than the raw data curves and can provide a more convenient way to identify the flow regimes and their locations. As shown in FIG. 11, the original signal curve 1101 and the less noisy, filtered signal curve 1102 are plotted together, as pressure (psi) vs. time (sec). The derivative 1103 of the original signal curve 1101 has a lot of fluctuations, from which it is difficult to derive useful information. In contrast, the derivative curve 1104 of the filtered signal curve 1103 is relatively smooth. A flow regime of IARF can be identified and the location of IARF 1105 can now be easily detected from the smooth derivative curve 1104.

The filtered smooth curve also makes it possible to analyze events in detail. For example, FIG. 12 shows that the filtered signal can be used to extrapolate the formation pressure from the smooth, reconstructed buildup curve 1201. A linear extrapolation 1202 yields a reservoir pressure of 4914.1 psi, which is close to the repeatability of the FPWD gauge used to measure the pressure, when compared with the value obtained from analyzing the entire curve (described with reference to FIGS. 10A, 10B, and 10C above).

Being able to reconstruct smooth curves from noisy raw data makes it possible to identify various events that otherwise might be obscured by the noises. For example, in a formation testing operation, the fluids are typically pumped from the formations into the wellbore or into sample collectors. At the same time, the formation tester measures and records various properties (e.g., pressures, temperatures, optical properties, etc.) of the fluids being pumped. These measurement data include valuable information about the fluids being pumped. This information would be helpful to the operator in making decisions. Unfortunately, such data are often noisy and voluminous, making it difficult to extract valuable information in real time. With embodiments of the invention, such data can be cleaned and compressed such that these data can be transmitted and/or analyzed in real time. In addition, the "clean" data also facilitates the extraction of useful or critical information that otherwise might be obscured by the noises.

Figure 13:
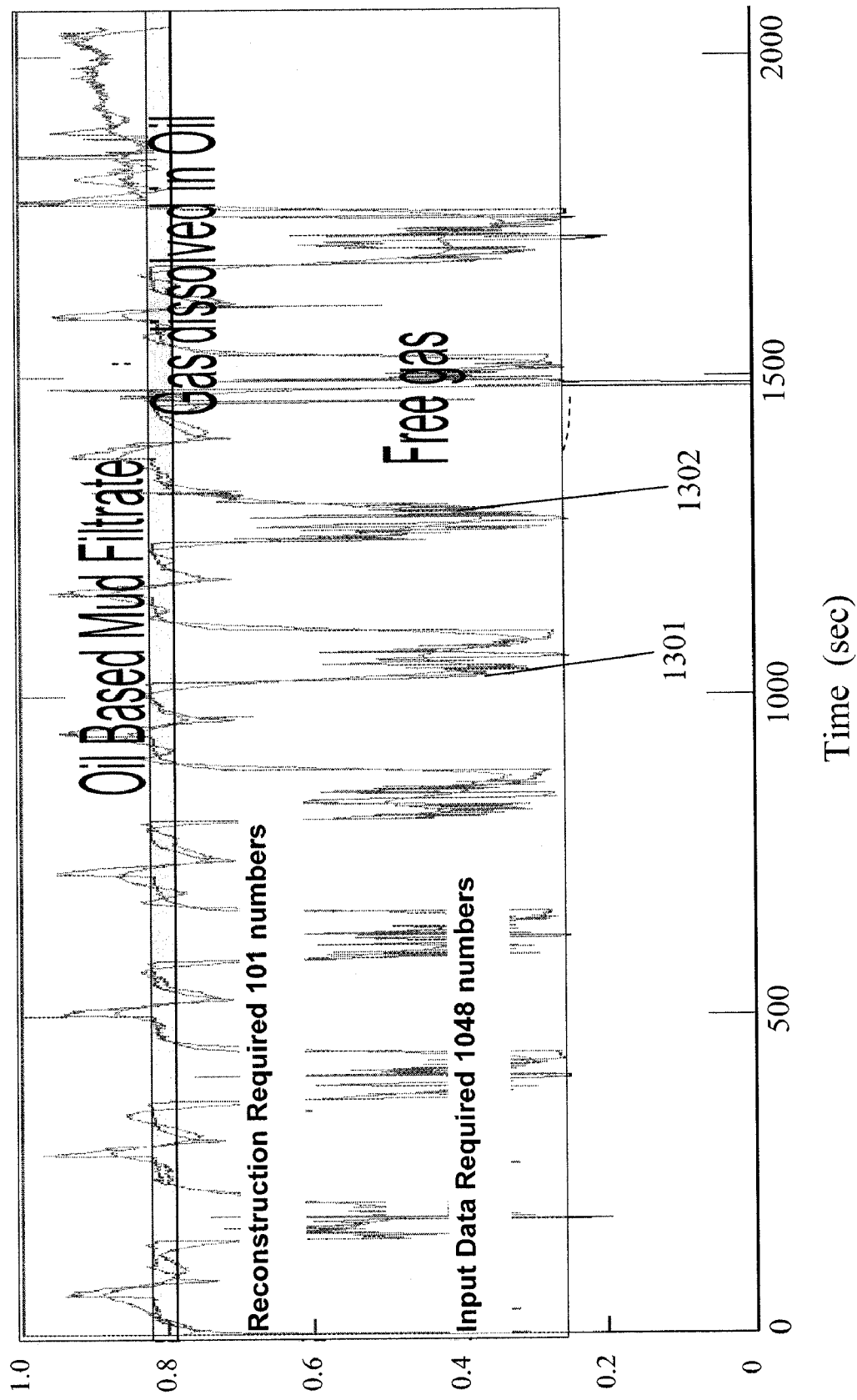
FIG. 13 shows processing of GOR data in accordance with an embodiment of the invention.

FIG. 13 illustrate one example of using embodiments of the invention to monitor the types of fluids being pumped by a formation tester. In this example, methods of the invention are used to detect multi-phase flow in a formation tester flow line based on optical spectroscopy data. The data processing method of the invention makes it possible to send processed optical spectroscopic signal from the formation tester to surface. As shown in FIG. 13, the input signal curve 1301 (having 2048 values), which is an LFA OILF (Live Fluid Analyzer oil fraction) curve. The input signal curve 1301 can be cleaned and compressed to 101 non-zero values using Debauchies (par=4) DWT followed by de-noising. The noise threshold has been set to two times the optical spectroscope resolution. The fewer data points make it possible to send these data uphole using a mud telemetry. These compressed data can then be used to reconstruct signal curve 1302.

Based on prior knowledge, thresholds for different types of fluid flow may be set. As shown in FIG. 13, various fluid phases exist in this example: (a) oil-based mud filtrate containing dissolved gas, (b) oil containing dissolved gas, and (c) free gas (with oil slugs possibly entrained).

Figure 14A:
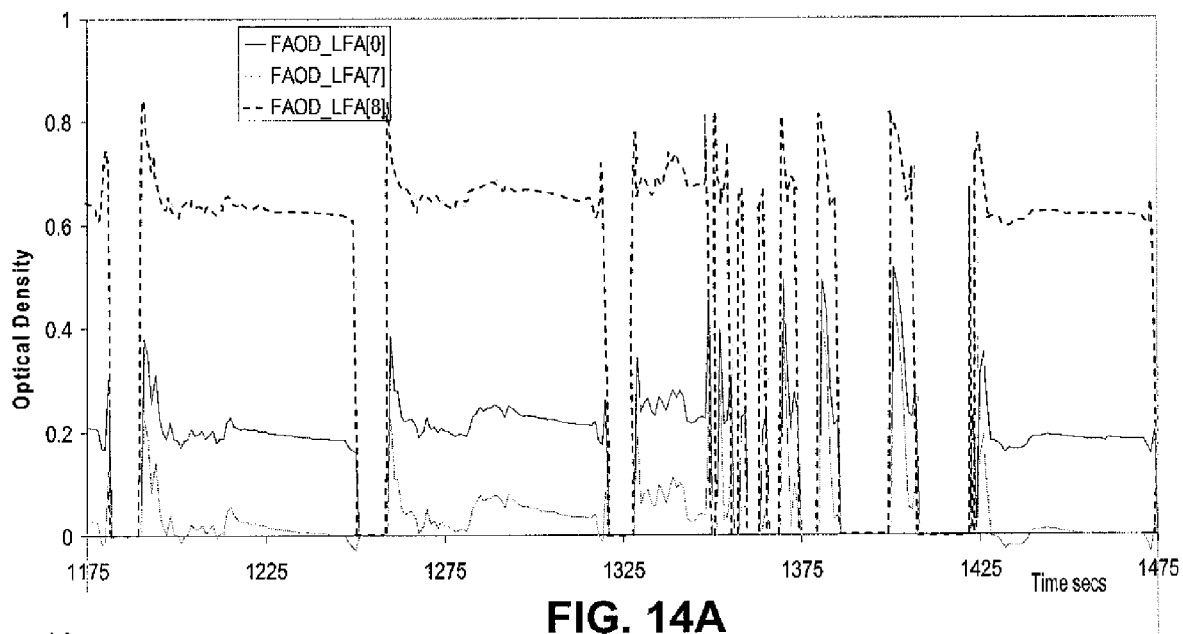
FIGS. 14A and 14B show GOR calculated from filtered and unfiltered input absorption spectroscopic data.
Figure 14B:
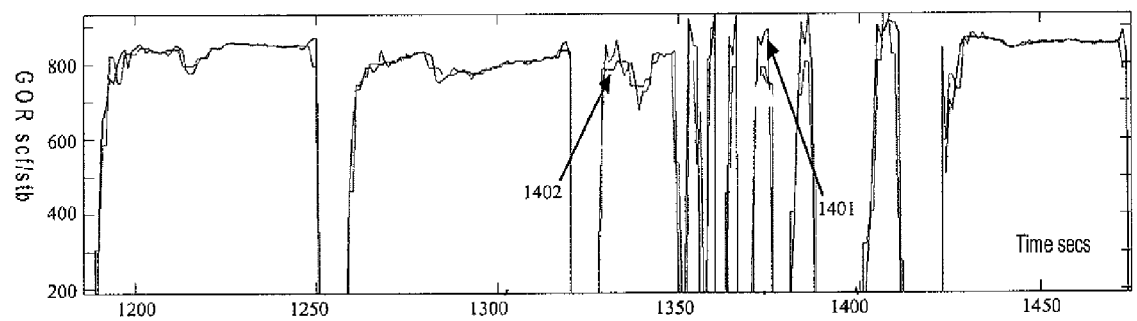

Methods for de-noising using DWT in accordance with embodiments of the invention may also be used to improve data analysis, even when data compression is not required. Often raw data acquired in oilfield exploration or production are too noisy to afford good quality interpretation. Proper noise removal may be necessary before meaningful analysis or interpretation of the data is possible. FIGS. 14A and 14B show an example illustrating the utility of methods of the invention in computing GOR from raw spectroscopic data. The resulting GOR has significantly less distortion as compared with that derived from the raw data without filtering. This is illustrated in FIGS. 14A and 14B.

In FIG. 14A, optical density data from three channels of a Live Fluid Analyzer (LFA) are shown. The two curves representing GOR calculated from the raw spectra (curve 1401) and from the denoised spectra (curve 1402) are shown in FIG. 14B. Compared with GOR curve 1401 calculated from raw data, the GOR curve 1402 calculated from the filtered data is much smoother and includes fewer unphysical values.

Some embodiments of the invention relate to systems for data processing related to oilfield operations. A system of the invention will include a processor (such as 27 shown in FIG. 1) that may be on the surface or included in a downhole tool. The processor may include memory that include a software for executing the methods of the invention. A system of the invention may be implemented using any suitable computer hardware, including a personal computer that may include a processor, a memory, a display, and an input device.

Figure 15:
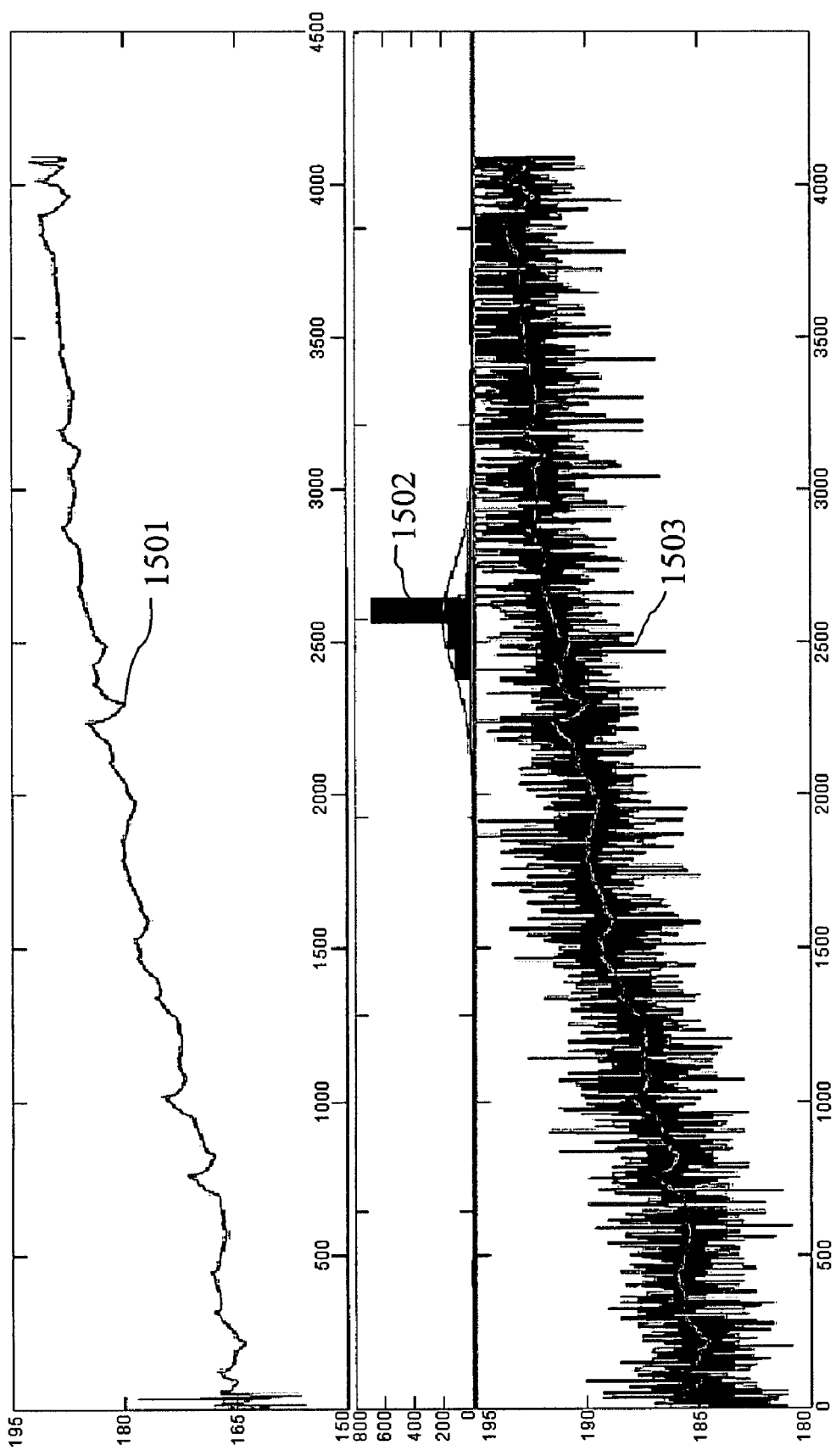
FIG. 15 shows data processing results used in obtaining GOR in accordance with embodiments of the invention.

A screen shot of computer display produced by a software package of the invention used to generate the filtered GOR is shown in FIG. 15. In this example, the display has been custom designed to show a de-noised optical density (GOR) curve 1501 in the upper panel, a histogram 1502 illustrating the distribution of the WC's in the middle panel, and the raw optical spectroscopic data (GOR) 1503 in the lower panel. One of ordinary skill in the art would appreciate that such displays may be customized in other fashions as desired by the user. The software package contains instructions for data processing and plotting, and is stored in a computer readable medium, such as a memory, a hard disk, a floppy disk, a compact disk (CD), a DVD, a flash memory, or the like. Such computer readable medium or memory may be part of a computer or processor, which may be a stand alone unit (such as a computer at a well site or in an office) or part of a tool (such as a downhole tool, including a formation tester).

Embodiments of the present invention may include one or more of the following advantages. Methods of the invention may be used to clean up noisy data such that information may be more easily derived from the measurements. Methods of the invention may also be used to compress the data such that the storage and retrieval of the data will be more efficient. In addition, the compressed data can be more efficiently transmitted. Curves reconstructed from the cleaned and/or compressed data may provide information that otherwise may be obscured by the noises. Methods and systems of the invention may be used in real-time applications, either downhole or at the surface (including remote sites).

While the invention has been described with respect to a limited number of embodiments, those skilled in the art, having benefit of this disclosure, will appreciate that other embodiments can be envisioned that do not depart from the scope of the invention as disclosed herein. For example, while the above description uses data from a formation tester to illustrate methods of the invention, embodiments of the invention may also be applied to other types of data typically encountered in oilfield exploration and production. Accordingly, the scope of the invention shall be limited only by the attached claims.

What is claimed is:

1. A method for processing formation tester data, comprising:
   obtaining the formation tester data, wherein the formation tester data are time domain data acquired with a formation tester in a wellbore;
   transforming, using a wavelet transform, the formation tester data into a second domain other than the time domain to produce transformed data;

identifying distortions in the transformed data by analyzing a distribution of wavelet coefficients;

removing the distortions from the transformed data to produce de-noised data; and transforming the de-noised data from the second domain back to the time domain to produce cleaned-up formation tester data.

2. The method of claim 1, wherein the wavelet transform is a discrete wavelet transform.

3. The method of claim 1, further comprising deriving a formation property from the cleaned-up formation tester data.

4. The method of claim 1, further comprising compressing the cleaned-up formation tester data.

5. The method of claim 4, wherein the compressing the cleaned-up formation tester data uses a wavelet transform.

6. A method for processing formation tester data, comprising:

obtaining the formation tester data, wherein the formation tester data are time domain data acquired with a formation tester in a wellbore;

decomposing the formation tester data using a low-pass filter to produce a first dataset;

decomposing the formation tester data using a high-pass filter to produce a second dataset;

identifying and removing distortions from the second dataset to yield a corrected second dataset; and reconstructing a corrected formation tester data from the first dataset and the corrected second dataset.

7. The method of claim 6, wherein the low-pass filter and the high-pass filter are derived from Fourier transform or wavelet transform.

8. The method of claim 6, further comprising deriving a formation property from the corrected formation tester data.

9. The method of claim 6, wherein low-pass filter and the high-pass filter are derived from discrete wavelet transform.

10. The method of claim 9, wherein the removing the distortions comprises analyzing a distribution of wavelet coefficients.

11. The method of claim 10, wherein the analyzing comprising analysis of at least one selected from the group consisting of a mean and a standard deviation of the distribution of wavelet coefficients as a function of a decomposition level.

12. The method of claim 6, further comprising compressing the corrected formation tester data to produce a compressed dataset.

13. The method of claim 12, wherein the compressing uses a wavelet lifting technique.

14. The method of claim 12, further comprising reconstructing signals from the compressed dataset.

15. The method of claim 14, further comprising identifying a trend or occurrence of an event from the reconstructed signals.

16. A system for data processing, comprising a processor and a memory, wherein the memory stores a program having instructions for:

transforming, using a wavelet transform, formation tester data, which are in time domain, into a second domain other than the time domain to produce transformed data;

identifying distortions in the transformed data by analyzing a distribution of wavelet coefficients;

removing the distortions from the transformed data to produce de-noised data; and transforming the de-noised data from the second domain back to the time domain to produce cleaned-up formation tester data.

17. The system of claim 16, wherein the program further comprises instructions for compressing the cleaned-up formation tester data.

18. The system of claim 16, wherein the wavelet transform is a discrete wavelet transform.

19. The system of claim 16, wherein the system is disposed in a formation tester.

* * * * *